UNITED STATES PATENT OFFICE.

OWEN LAUGHLIN AND WILLIAM H. THOMAS, OF MOUNT STERLING, KENTUCKY, ASSIGNORS OF ONE-THIRD TO FRANK LAUGHLIN, OF SAME PLACE.

RIDING-SADDLE.

SPECIFICATION forming part of Letters Patent No. 370,266, dated September 20, 1887.

Application filed May 3, 1887. Serial No. 236,966. (No model.)

*To all whom it may concern:*

Be it known that we, OWEN LAUGHLIN and WILLIAM H. THOMAS, of Mount Sterling, in the county of Montgomery and State of Kentucky, have invented new and useful Improvements in Elastic Saddles for Horseback Riding; and we do hereby declare that the following is a full and accurate description of the same, reference being had to the accompanying drawings, wherein—

Figure 1 is a perspective view of our saddle-tree. Fig. 2 represents in plan the same. Fig. 3 is a longitudinal section of the same. Figs. 4, 5, 6, 7, and 8 represent the metallic details; Figs. 9 and 10, details of leather re-enforce pieces.

Our invention relates to flexible saddle-trees made from a series of layers of solid leather or other similar material pressed and molded into proper shape and rigidly fastened together; and it consists in the particulars hereinafter named.

We are aware that saddle-trees made principally of leather have been in use for a very long time, and therefore we do not herein claim, broadly, a tree made from several layers or thicknesses of leather.

Sound and solid leather—such as sole-leather—is selected, and blanks A are cut from it, having the proper shape to form the tree, as or similar to that shown in Fig. 1. Two or more of said blanks are taken, and two or more stiffening-pieces, *b*, and having thoroughly wet them, they are molded into shape in a proper mold with pressure, if necessary, and are then left to dry. The re-enforce or stiffening pieces *b* are placed between the blanks A at the cantle to thicken the tree at that point and impart to its upper surface the proper contour for the rider, while the under side is in proper shape to fit the horse's back. Other similar re-enforce pieces are added to the arch for the purpose of stiffening and thickening the tree at that point. A sufficient thickness of the tree can easily be obtained in that way; but leather has not sufficient enduring rigidity to long resist constant pressure tending to destroy its form. Therefore a metallic plate, *d*, or several plates, if necessary, are interposed between the layers or placed on the surface on the cantle, and other plates, *e*, similar in nature to the plates *d*, are placed in and over the arch. The several layers of leather and the metallic plates are then firmly united by rivets, so that transversely the saddle-tree becomes very rigid, but longitudinally it remains flexible and free to adapt its shape to the back of the horse, and thereby also enhance the comfort of the rider. The stirrup-strap loop *g* is riveted at one end to the arch-plate *e* and at the other end to the saddle-tree, and the girth-straps D are riveted to the lugs *h h* of the tree, the end of said strap being inserted between the layers of the same, so that the rivet is supported at both its ends.

A portion of the tree along the middle longitudinally is cut away, so as to form a long slot, F, which relieves the ridge of the horse's backbone from contact with the saddle, and it also serves purposes of ventilation and conduces to the comfort of both horse and rider. To prevent the hairs from the horse reaching and soiling the clothes of the rider, a piece of stout canvas or other suitable material is placed over said slot F and firmly nailed or stitched along its edges down to the tree.

Having described our invention, we claim—

1. A riding saddle-tree constructed of two or more pieces of suitable heavy solid leather re-enforced at the arch and cantle with pieces *b* and with metallic straps *d e*, whereby the saddle is made rigid transversely but flexible longitudinally, to adapt its form to that of the horse, as set forth.

2. As an improved article of manufacture, a saddle-tree flexible longitudinally and rigid transversely, constructed of two or more thicknesses of sole-leather molded to form and strengthened transversely with metallic plates.

OWEN LAUGHLIN.
WILLIAM H. THOMAS.

Attest:
W. B. O'CONNELL,
PAT LAUGHLIN.

UNITED STATES PATENT OFFICE.

OWEN LAUGHLIN AND WILLIAM H. THOMAS, OF MOUNT STERLING, KENTUCKY, ASSIGNORS OF ONE-THIRD TO FRANK LAUGHLIN, OF SAME PLACE.

RIDING-SADDLE.

SPECIFICATION forming part of Letters Patent No. 370,266, dated September 20, 1887.

Application filed May 3, 1887. Serial No. 236,966. (No model.)

*To all whom it may concern:*

Be it known that we, OWEN LAUGHLIN and WILLIAM H. THOMAS, of Mount Sterling, in the county of Montgomery and State of Kentucky, have invented new and useful Improvements in Elastic Saddles for Horseback Riding; and we do hereby declare that the following is a full and accurate description of the same, reference being had to the accompanying drawings, wherein—

Figure 1 is a perspective view of our saddle-tree. Fig. 2 represents in plan the same. Fig. 3 is a longitudinal section of the same. Figs. 4, 5, 6, 7, and 8 represent the metallic details; Figs. 9 and 10, details of leather re-enforce pieces.

Our invention relates to flexible saddle-trees made from a series of layers of solid leather or other similar material pressed and molded into proper shape and rigidly fastened together; and it consists in the particulars hereinafter named.

We are aware that saddle-trees made principally of leather have been in use for a very long time, and therefore we do not herein claim, broadly, a tree made from several layers or thicknesses of leather.

Sound and solid leather—such as sole-leather—is selected, and blanks A are cut from it, having the proper shape to form the tree, as or similar to that shown in Fig. 1. Two or more of said blanks are taken, and two or more stiffening-pieces, *b*, and having thoroughly wet them, they are molded into shape in a proper mold with pressure, if necessary, and are then left to dry. The re-enforce or stiffening pieces *b* are placed between the blanks A at the cantle to thicken the tree at that point and impart to its upper surface the proper contour for the rider, while the under side is in proper shape to fit the horse's back. Other similar re-enforce pieces are added to the arch for the purpose of stiffening and thickening the tree at that point. A sufficient thickness of the tree can easily be obtained in that way; but leather has not sufficient enduring rigidity to long resist constant pressure tending to destroy its form. Therefore a metallic plate, *d*, or several plates, if necessary, are interposed between the layers or placed on the surface on the cantle, and other plates, *e*, similar in nature to the plates *d*, are placed in and over the arch. The several layers of leather and the metallic plates are then firmly united by rivets, so that transversely the saddle-tree becomes very rigid, but longitudinally it remains flexible and free to adapt its shape to the back of the horse, and thereby also enhance the comfort of the rider. The stirrup-strap loop *g* is riveted at one end to the arch-plate *e* and at the other end to the saddle-tree, and the girth-straps D are riveted to the lugs *h h* of the tree, the end of said strap being inserted between the layers of the same, so that the rivet is supported at both its ends.

A portion of the tree along the middle longitudinally is cut away, so as to form a long slot, F, which relieves the ridge of the horse's backbone from contact with the saddle, and it also serves purposes of ventilation and conduces to the comfort of both horse and rider. To prevent the hairs from the horse reaching and soiling the clothes of the rider, a piece of stout canvas or other suitable material is placed over said slot F and firmly nailed or stitched along its edges down to the tree.

Having described our invention, we claim—

1. A riding saddle-tree constructed of two or more pieces of suitable heavy solid leather re-enforced at the arch and cantle with pieces *b* and with metallic straps *d e*, whereby the saddle is made rigid transversely but flexible longitudinally, to adapt its form to that of the horse, as set forth.

2. As an improved article of manufacture, a saddle-tree flexible longitudinally and rigid transversely, constructed of two or more thicknesses of sole-leather molded to form and strengthened transversely with metallic plates.

OWEN LAUGHLIN.
WILLIAM H. THOMAS.

Attest:
W. B. O'CONNELL,
PAT LAUGHLIN.